United States Patent
Endo et al.

(10) Patent No.: US 9,785,343 B2
(45) Date of Patent: Oct. 10, 2017

(54) TERMINAL DEVICE, IMAGE DISPLAY METHOD, AND STORAGE MEDIUM

(71) Applicant: Sony Mobile Communications Japan, Inc., Minato-ku (JP)

(72) Inventors: Kosuke Endo, Tokyo (JP); Hironori Suzuki, Tokyo (JP)

(73) Assignee: Sony Mobile Communications Inc., Tokyo (JP)

( * ) Notice: Subject to any disclaimer, the term of this patent is extended or adjusted under 35 U.S.C. 154(b) by 517 days.

(21) Appl. No.: 13/667,502

(22) Filed: Nov. 2, 2012

(65) Prior Publication Data

US 2013/0141361 A1 Jun. 6, 2013

Related U.S. Application Data

(60) Provisional application No. 61/565,697, filed on Dec. 1, 2011.

(51) Int. Cl.
*G09G 1/00* (2006.01)
*G06F 3/0488* (2013.01)

(52) U.S. Cl.
CPC .......... *G06F 3/04883* (2013.01); *G06F 2203/04806* (2013.01)

(58) Field of Classification Search
CPC .... G06F 3/048; G06F 3/0484; G06F 3/04845; G06F 2203/04806; G06F 2203/04808; G06F 3/04886; G06F 3/04842
USPC ............... 715/760–769, 863, 800, 801, 815; 345/173–204
See application file for complete search history.

(56) References Cited

U.S. PATENT DOCUMENTS

| | | | |
|---|---|---|---|
| 2008/0238945 A1* | 10/2008 | Wakizaka | 345/660 |
| 2009/0061948 A1* | 3/2009 | Lee et al. | 455/566 |
| 2009/0085936 A1* | 4/2009 | Chen et al. | 345/661 |
| 2009/0160809 A1* | 6/2009 | Yang et al. | 345/173 |
| 2009/0219290 A1 | 9/2009 | Kakie | |
| 2009/0300554 A1* | 12/2009 | Kallinen | 715/863 |
| 2010/0232704 A1* | 9/2010 | Thorn | 382/195 |
| 2011/0080430 A1* | 4/2011 | Nishibe et al. | 345/661 |
| 2011/0109581 A1* | 5/2011 | Ozawa et al. | 345/173 |
| 2012/0038676 A1* | 2/2012 | Malecki | 345/660 |

FOREIGN PATENT DOCUMENTS

JP  2011-123501  6/2011

OTHER PUBLICATIONS

Extended European Search Report for corresponding Application No. 12192123.3 (7 pages) dated Jan. 27, 2017.

* cited by examiner

*Primary Examiner* — Michael Faragalla
(74) *Attorney, Agent, or Firm* — Oblon, McClelland, Maier & Neustadt, L.L.P.

(57) ABSTRACT

An information processing apparatus including a display; a touch panel stacked on or integrally formed with the display; and a controller that receives an output from the touch panel indicating that first gesture input is detected that substantially encloses a region of the display, and controls the display to expand an image displayed by the display based on a size of the region.

20 Claims, 12 Drawing Sheets

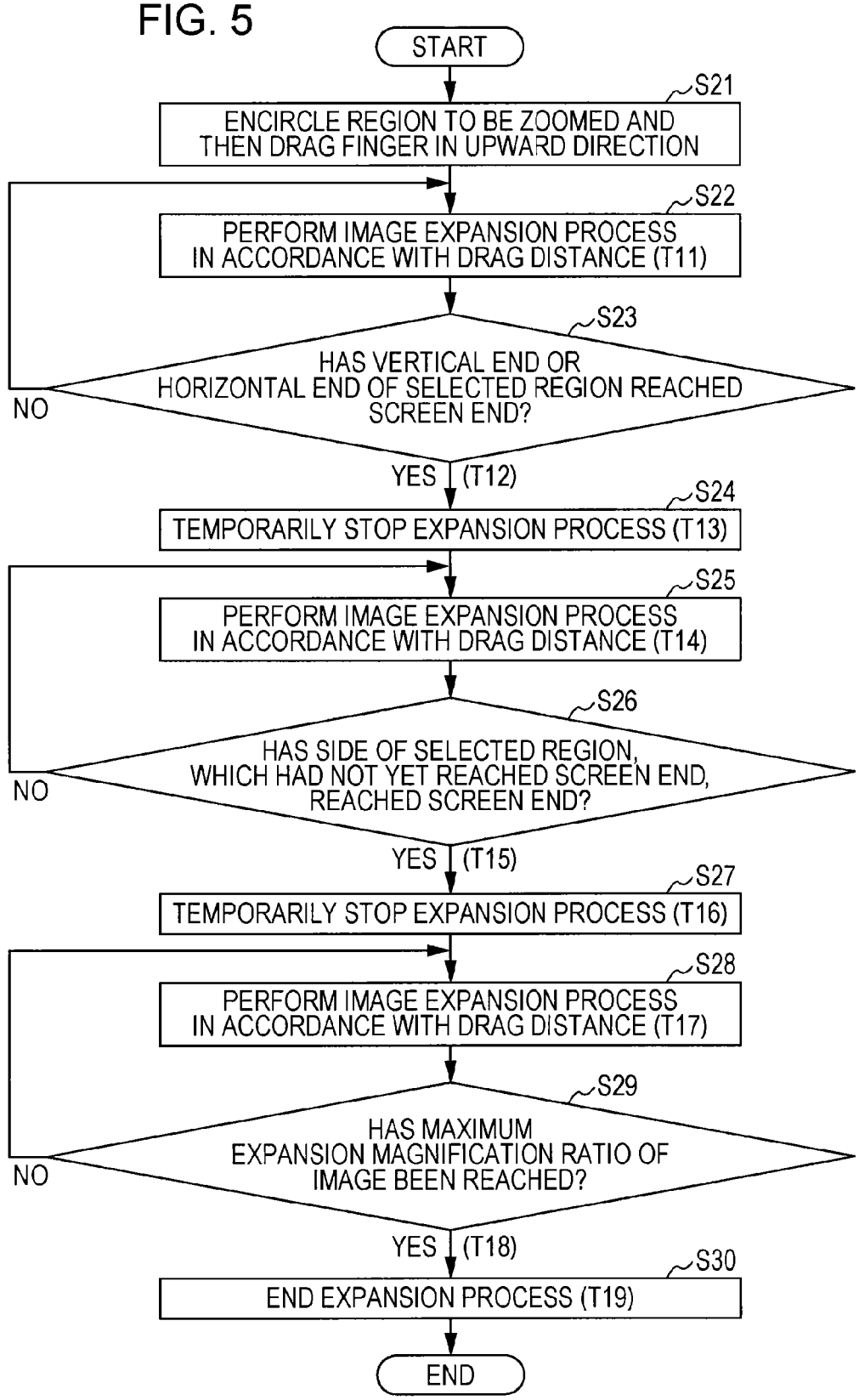

TERMINAL DEVICE, IMAGE DISPLAY METHOD, AND STORAGE MEDIUM

CROSS REFERENCE TO RELATED APPLICATION

The present application claims the benefit of the earlier filing date of U.S. Provisional Patent Application Ser. No. 61/565,697 filed on Dec. 1, 2011, the entire contents of which is incorporated herein by reference.

BACKGROUND

Field of the Disclosure

The present disclosure relates to a terminal device, an image display method, and a storage medium and, more particularly, relates to a technology for expanding or reducing an image displayed on a terminal device.

Description of Related Art

Hitherto, multi-functional mobile phone terminals allow various operations to be performed with a touch operation on a display screen, the mobile phone terminals being referred to as smartphones. Specifically, smartphones include a touch panel, and a user is able to perform a touch operation by touching a display screen with a finger or the like. For example, by performing a touch operation in which an icon displayed on the screen is touched with a finger by the user, the function indicated by the icon can be started up.

As one of touch operations, an operation called a pinch zoom is known. This is an operation of touching two places on the screen with two fingers at the same time. By increasing the spacing between two fingers touching the screen, it is possible to instruct size expansion of the image displayed on the screen. Furthermore, by decreasing the spacing between two fingers touching the screen, it is possible to instruct size reduction of the image displayed on the screen. The expansion ratio and the reduction ratio of the image are determined in accordance with the change in the spacing between two fingers touching the screen.

It is described in Japanese Unexamined Patent Application Publication No. 2011-123501 that an image of the face of an operator who is viewing the display screen is captured using a camera provided in a terminal, the distance from the face of the operator to the terminal is determined on the basis of the captured image, and the expansion or the reduction of the image on the display screen is performed in response to the change of the distance.

SUMMARY

With an operation called a pinch zoom, by only increasing and decreasing the spacing between two fingers touching the touch panel, the expansion and the reduction of the image can be performed at a magnification ratio corresponding to the spacing. For this reason, the pinch zoom is an operation technique that enables expansion and reduction to be performed intuitively. However, in order to perform a pinch zoom, it is necessary to touch the touch panel at the same time with two fingers. Consequently, when the terminal is to be operated while being held with one hand, it is necessary to operate the terminal by touching it with a finger of the other hand. Thus, it is difficult to operate the terminal with only one hand holding the terminal. That is, in a case where, while holding the terminal with one hand, the terminal is to be operated with a finger of the hand holding it, a touch operation is performed with the thumb. However, with only one thumb, a pinch zoom operation requiring simultaneous touching of two places is not possible.

As described in Japanese Unexamined Patent Application Publication No. 2011-123501, in a process in which an image of the face of an operator is captured using a camera incorporated therein, and expansion/reduction of the image is performed in accordance with the distance between the face detected from the captured image and the terminal, an operation is possible by holding the terminal with only one hand. However, in order to perform such an expansion process, it is necessary to arrange a camera on the display panel mounted surface of the terminal, and a problem arises in that there is a constraint in terminals that can be used.

According to a first exemplary embodiment, the disclosure is directed to an information processing apparatus including a display; a touch panel stacked on or integrally formed with the display; and a controller that receives an output from the touch panel indicating that first gesture input is detected that substantially encloses a region of the display, and controls the display to expand an image displayed by the display based on a size of the region.

According to another exemplary embodiment, the disclosure is directed to an information processing method performed by an information processing apparatus, the method comprising: detecting, by a touch panel stacked on or integrally formed with a display of the information processing apparatus, a gesture input that substantially encloses a region of the display; and controlling the display to expand an image displayed by the display based on a size of the region.

According to another exemplary embodiment, the disclosure is directed to a non-transitory computer-readable medium including computer program instructions, which when executed by an information processing apparatus, cause the information processing apparatus to perform a process, the process comprising: detecting, by a touch panel stacked on or integrally formed with a display of the information processing apparatus, a gesture input that substantially encloses a region of the display; and controlling the display to expand an image displayed by the display based on a size of the region.

BRIEF DESCRIPTION OF DRAWINGS

FIG. 5 is a flowchart illustrating an example of detailed processing at the time of image expansion according to the embodiment of the present disclosure.

DETAILED DESCRIPTION

Examples of a terminal device, an image display method, and a storage medium according to embodiments of the present disclosure will be described below in the following order with reference to the drawings.
1. Example of configuration of terminal device (FIGS. 1 and 2)
2. Example of image expansion process (FIGS. 3 to 6)
3. Example of setting of center position at time of expansion (FIGS. 7 and 8)
4. Example of image reduction process (FIGS. 9 and 10)
5. Modification (FIGS. 11 and 12)
[1. Example of Configuration of Terminal Device]

Figure 1:
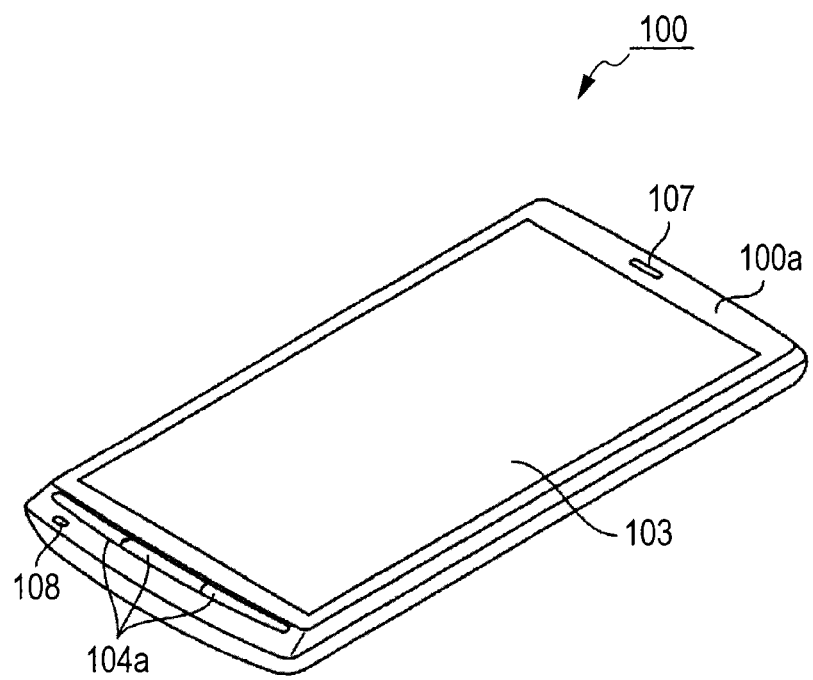
FIG. 1 is a perspective view illustrating an example of the shape of a terminal device according to an embodiment of the present disclosure.

FIG. 1 illustrates a schematic configuration of a terminal device according to an embodiment of the present disclosure. A display unit 103 and operation keys 104a are arranged on the surface of a terminal device 100. The operation keys 104a are members forming a part of the operation unit 104 (to be described later).

The display unit 103 is constituted by a display panel formed of an LCD (Liquid Crystal Display), an organic EL (electroluminescence) panel, etc., and a driving circuit thereof. For the display panel, a display panel having a comparatively large size, the length of the diagonal line of the screen being, for example, on the order of 4 inches (approximately 10 centimeters), is used. The display unit 103 includes a touch panel stacked on the display panel. That is, the touch panel included in the display unit 103 functions as the operation unit 104. For the touch panel, for example, a touch panel of an electrostatic capacitance method is used, so that the finger of an operator or the tip end of a stylus touching the panel surface is detected.

Furthermore, a speaker 107 and a microphone 108 for telephone conversation are arranged on the surface of the terminal device 100.

Figure 2:
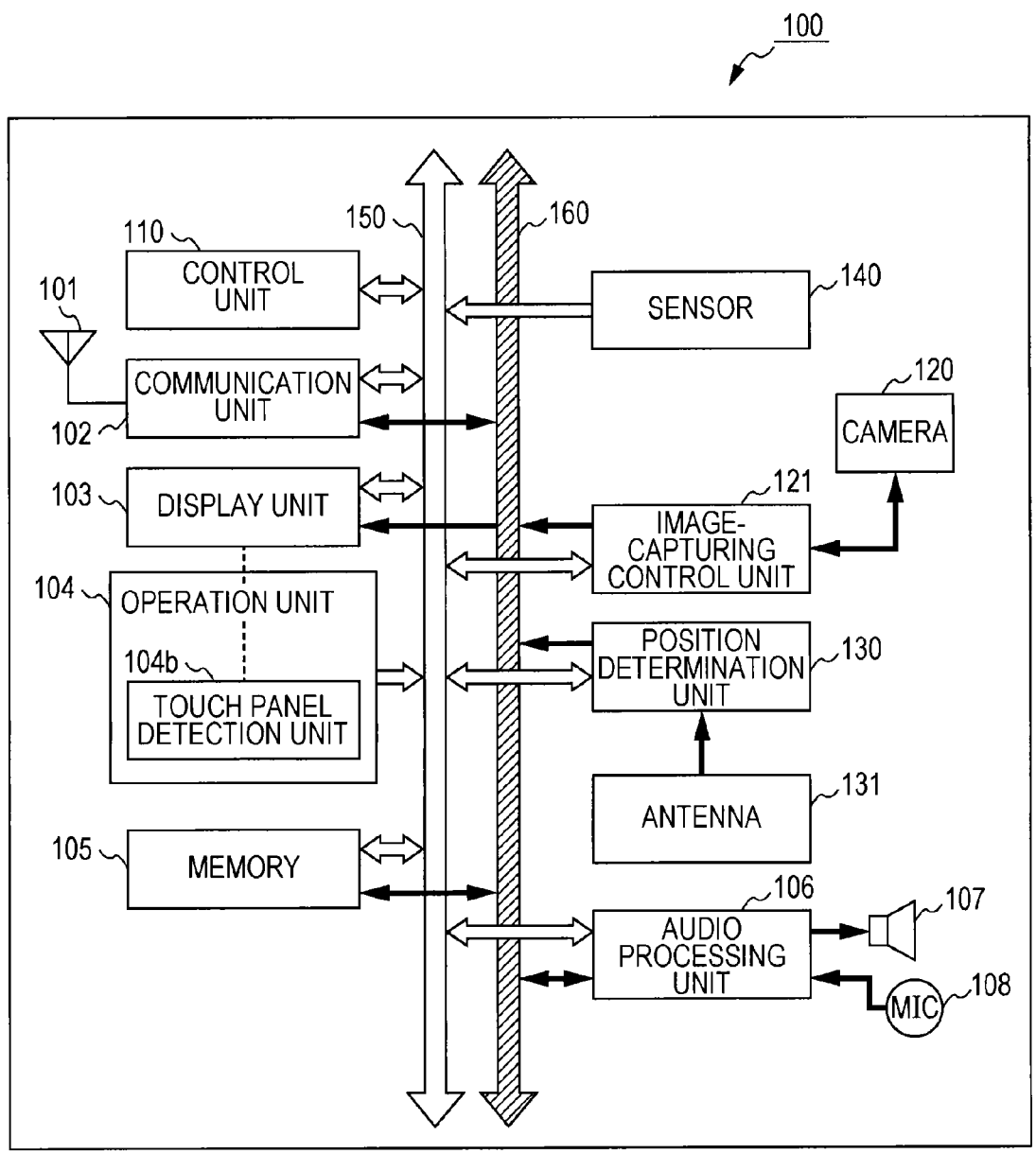
FIG. 2 is a block diagram illustrating an example of the configuration of the terminal device according to the embodiment of the present disclosure.

Next, a description will be given, with reference to FIG. 2, of an example of the internal configuration of the terminal device 100.

The terminal device 100, which is a mobile phone terminal, includes an antenna 101 that performs transmission and reception of radio waves with a base station for wireless telephone, a communication processing unit 102 to which the antenna 101 is connected, and a control unit 110.

The communication processing unit 102 performs wireless communication with the base station for wireless telephone under the control of the control unit 110. At the time of a voice call, the communication processing unit 102 supplies voice data contained in the received data to the audio processing unit 106. The audio processing unit 106 performs a process for decoding the supplied voice data so as to obtain an analog audio signal. The audio processing unit 106 supplies the obtained analog audio signal to the speaker 104. The speaker 104 performs voice output in accordance with the input analog audio signal.

Furthermore, the terminal device 100 includes a microphone 108 for performing sound collection, and supplies the audio signal output by the microphone 108 to the audio processing unit 106. The audio processing unit 106 codes the input audio signal into voice data in a predetermined coding format. Then, the audio processing unit 106 supplies the coded voice data to the communication processing unit 102. The communication processing unit 102 converts the supplied voice data into packets in a transmission format and also modulates the voice data into data for transmission use. The communication processing unit 102 supplies the modulated transmission signal to the antenna 101, whereby the modulated transmission signal is radiated as a wireless radio wave from the antenna 101.

The processing units, such as the communication processing unit 102 and the audio processing unit 106, transmit and receive control data to and from the control unit 110 through a control line 150, and also perform the transmission of data through a data line 160.

Furthermore, the terminal device 100 includes the display unit 103 and the operation unit 104. The display on the display unit 103 is performed under the control of the control unit 110. The display unit 103 displays information necessary at the time of the call origination and reception of a telephone, information, such as the destination of electronic mail and a message thereof, an image that is obtained by being connected to the Internet, an image captured by the camera unit 120, information that is obtained in consequence of the execution of various functions provided in the terminal device 100, and the like. The operation unit 104, as described above, is constituted by the operation keys 104a (FIG. 1) arranged in the terminal device 100, and a touch panel that is stacked or integrally arranged on the display unit 103, and supplies an instruction by a user operation to the control unit 110. The operation of the touch panel arranged on the display unit 103 is detected by a touch panel detection unit 104b in the operation unit 104. The data of the touch operation detected by the touch panel detection unit 104b is supplied to the control unit 110. When the data of the touch operation is supplied, the control unit 110 judges which place of the image that is being displayed on the display unit 103 has been touched, and performs a process based on the touch operation. For example, in a case where the control unit 110 detects one of the icons in the display image, the control unit 110 starts up the function indicated by the icon. Furthermore, also in a case where there is an operation of designating a specific region or the like in the image with a touched path for the purpose of expanding or reducing an image (to be described later), the control unit 110 performs a corresponding process.

The control unit 110 is formed of a microprocessor, and performs communication control, an audio process, the control thereof, image processing, and the control thereof. An expansion process and a reduction process at the time of image display (to be described later) are also performed by the control unit 110. Furthermore, the control unit 110 is connected to a memory 105 through the control line 150 and the data line 160. Then, the control unit 110 reads data and a program stored in the memory 105.

Furthermore, the terminal device 100 includes a camera unit 120. The camera unit 120 performs image capture under the control of an image-capturing control unit 121. The data of a still image or a moving image obtained by the camera unit 120 by performing image capture is stored in the memory 105.

Furthermore, the terminal device 100 includes a position determination unit 130. The position determination unit 130 determines the current position by using a GPS (Global Positioning System). More specifically, the position determination unit 130 performs a process for receiving a signal from a GPS satellite, which is obtained by a GPS antenna 131, and determines the current position. The position information on the current position, which has been determined by the position determination unit 130, is supplied to the control unit 110.

Furthermore, the terminal device 100 includes sensors 140 that are constituted by various sensors, such as an acceleration sensor and an orientation sensor. The data detected by the sensors 140 is supplied to the control unit 110, and the control unit 110 judges the state of the terminal device 100. For example, the control unit 110 detects the orientation of the terminal device 100 on the basis of the detection data of the sensors 140, and performs control such that the display direction of the image to be displayed on the display unit 103 is made to coincide with the orientation of the terminal device 100.

[2. Example of Image Expansion Process]

Next, the overall flow of processing performed when an image displayed on the display unit 103 of the terminal device 100 is to be expanded by the operation of a touch panel will be described with reference to the flowchart of FIG. 3 and the example of display of FIGS. 4A-4D.

It is assumed that the terminal device 100 is in a state in which the display unit 103 has displayed some sort of an image. In a case where a user instructs the expansion of a specific place in the image being displayed in a state in which this image display has been performed, a touch operation of drawing a path having a circular shape, which substantially encloses a specific place desired to be expanded, is performed with the fingers of the user or the like.

When the control unit 110 detects that a touch operation of drawing a path having a circular shape, which substantially encloses this specific place, has occurred (step S11), the control unit 110 normalizes the region enclosed by the path so as to obtain the selected region of the rectangle (step S12). More specifically, the control unit 110 sets, in the display image, a rectangle having, as sides, the lines tangential to the upper, lower, right, and left ends of the region enclosed by the path having a circular shape. Then, the control unit 110 sets the display region of the rectangle within the display image to be a selected region for which expansion is designated.

Next, the user performs a dragging operation on the surface of the screen in the upward direction as the operation of the touch panel. The term "operation of dragging on the screen" refers to an operation of moving the finger touching the screen along the screen. The control unit 110 determines whether or not a dragging operation has been performed in the upward direction (step S13). Here, when the relevant dragging operation is not detected, the image expansion process is completed.

Then, when it is determined in step S13 that a dragging operation has been performed in the upward direction, the control unit 110 performs a zoom process of expanding the image being displayed in accordance with the amount of movement of the finger at the time of the dragging operation (step S14). At the time of the zoom process, the control unit 110 performs an expansion process targeting the selected region that is set in step S12.

Then, the control unit 110 determines whether or not one of the sides of the region of the rectangle of the selected region that is set in step 12 has reached the end of the screen of the display unit 103 as a result of the execution of the image expansion that is associated with the dragging operation (step S15). When this determination determines that one of the sides of the rectangle has reached the end of the screen of the display unit 103, the control unit 110 temporarily stops the image expansion process (step S16). At this time, the control unit 110 stops the expansion of the image displayed on the display unit 103 for a comparatively short fixed time period, such as, for example, 0.5 seconds, returns to the process of step S14 after the fixed time period has elapsed, whereby the expansion of the image is restarted.

Furthermore, when, in the determination of step S15, it has been determined that one of the sides of the selected region of the rectangle has not reached the end of the screen of the display unit 103, the control unit 110 determines whether or not the finger that was touching the screen for the purpose of the dragging operation has moved away from the screen (step S17). When, in this determination, it has been determined that the finger for the dragging operation has not been moved away from the screen, the process returns to step S14, whereby the control unit 110 allows the expansion of the image to be continued.

When it is determined in step S17 that the finger for the dragging operation has moved away from the screen, the control unit 110 stops the expansion of the image (step S18).

FIGS. 4A-4D illustrate an operation at the time of image expansion, and examples of images.

Figure 4A:
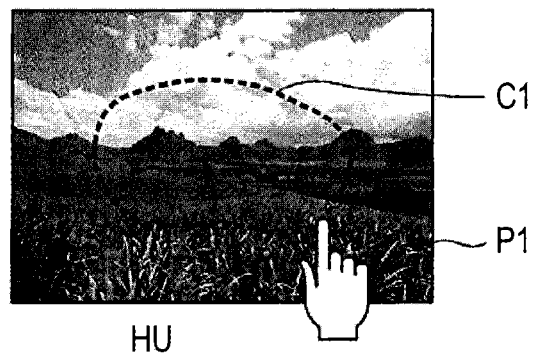
FIGS. 4A-4D illustrate an example of an image in an image expansion processing state according to the embodiment of the present disclosure.

First, the display unit 103 has displayed an image P, as shown in FIG. 4A. At this time, the user who wants to expand the display image performs a touch operation of drawing a path having a circular shape or an elliptical shape in such a manner as to enclose the region to be expanded with a finger. In the example of FIG. 4A, it is assumed that a touch operation has been performed on substantially the central portion of the image display region P1 so that a circle C1 indicated by the dashed line has been drawn with the finger of the user. The circle C1 indicated by the dashed line is illustrated to illustrate the path drawn by the finger, and such a path is not displayed on the screen.

Figure 4B:
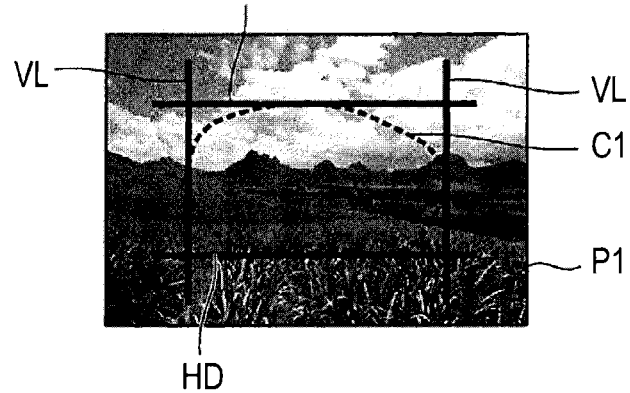

When the path C1 on which the touch operation has been performed is obtained, as shown in FIG. 4B, a rectangle having, as sides, the lines that are tangential to the upper, lower, right, and left ends of the region enclosed by the path C1, is set in the display image. More specifically, the tangential line HU that is tangential to the upper end of the region enclosed by the path C1, the tangential line HD that is tangential to the lower end of the region enclosed by the path C1, the tangential line VL that is tangential to the left end of the region enclosed by the path C1, and the tangential line VR that is tangential to the right end of the region enclosed by the path C1 are set.

Figure 4C:
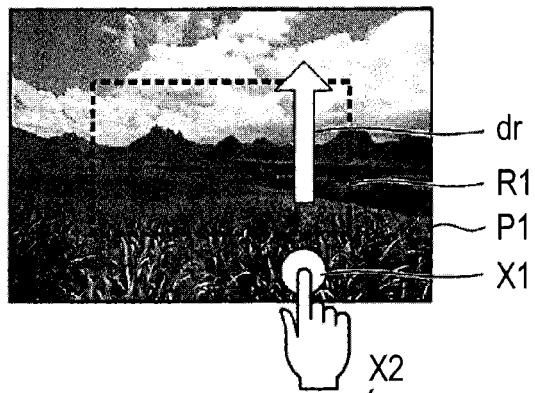

Then, as shown in FIG. 4C, the selected region R1 enclosed by the four tangential lines HU, HD, VL, and VR is determined. This selected region R1 is a selected region that is a target region for performing image expansion, and the control unit 110 performs a process for expanding the selected region R1. The tangential lines HU, HD, VL, and VR and the selected region R1 shown in FIG. 4B are not displayed on the screen.

After such a selected region R1 is determined, the control unit 110 expands the display image in association with the dragging operation performed on the surface of the screen in the upward direction. More specifically, as shown in FIG. 4C, the image is gradually expanded in association with the path dr of the dragging operation in which the touch position is moved in such a manner as to draw a substantially straight line in the upward direction from one arbitrary place X1 in the screen. At the time of this expansion, as shown in FIG.

4C, the image outside the selected region R1 is also correspondingly expanded and displayed as long as the image is within the image display region P1.

Figure 4D:
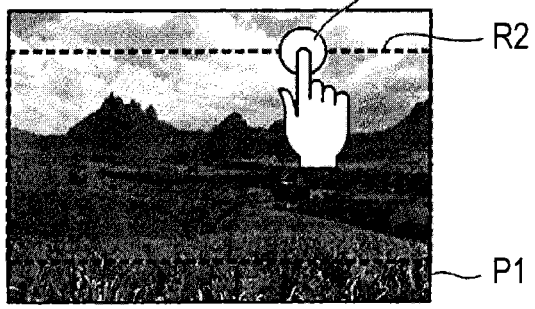

In the course of the expansion of the image, as shown in FIG. 4D, when the touch position X2 is reached as a result of the dragging operation, it is assumed that at least one side of the expanded selected region R1 coincides with one side of the image display region P1. The state shown in FIG. 4D shows that the side of the right end of the expanded selected region R2 coincides with the right end of the image display region P1, and the side of the left end of the selected region R2 coincides with the left end of the image display region P1.

Figure 3:
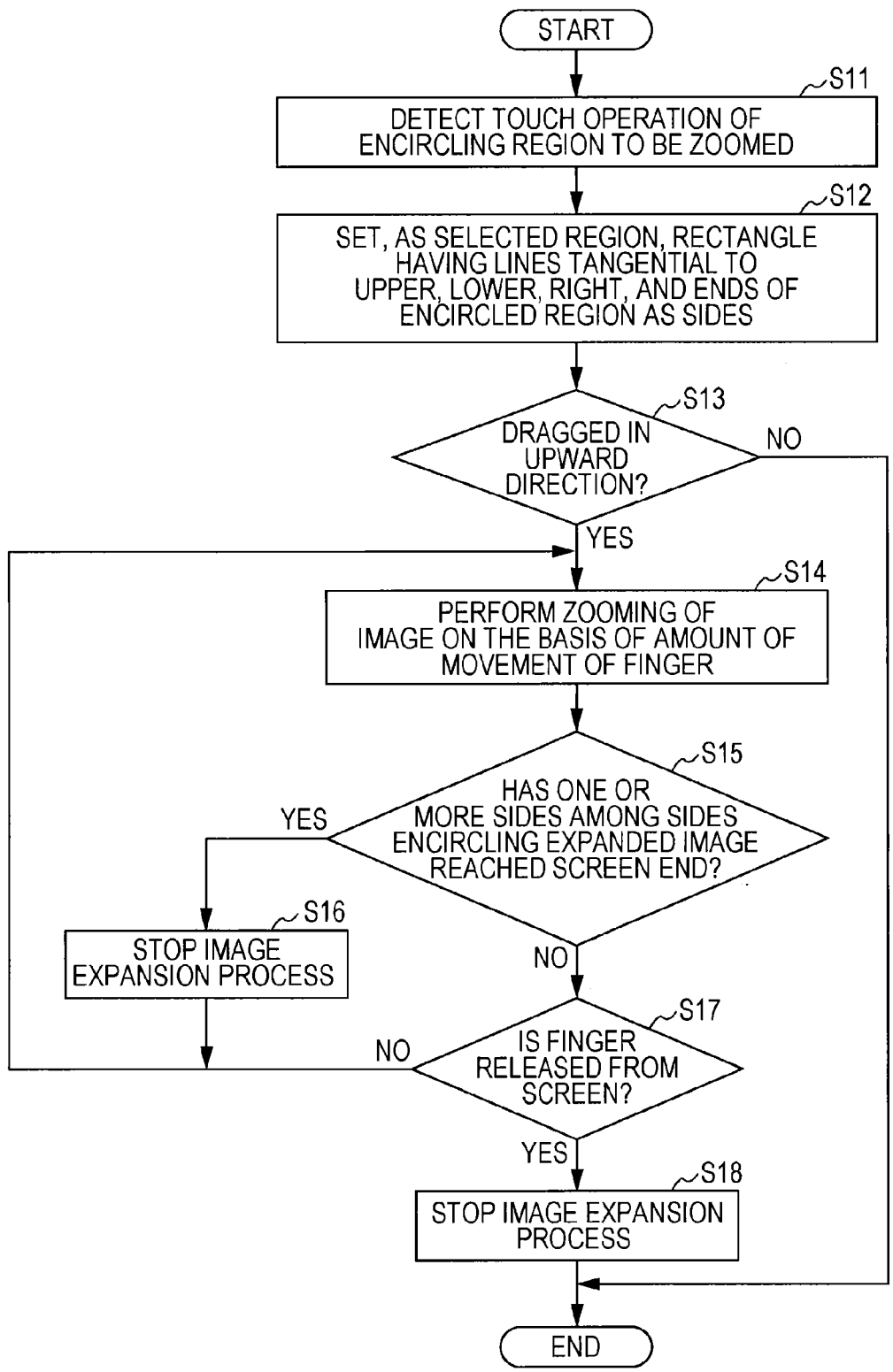
FIG. 3 is a flowchart illustrating an example of an image expansion process according to the embodiment of the present disclosure.

At the time of this state shown in FIG. 4D, the control unit 110 performs the process of step S16 in the flowchart of FIG. 3, and image expansion is temporarily stopped even if the dragging operation is continued.

Figure 6:
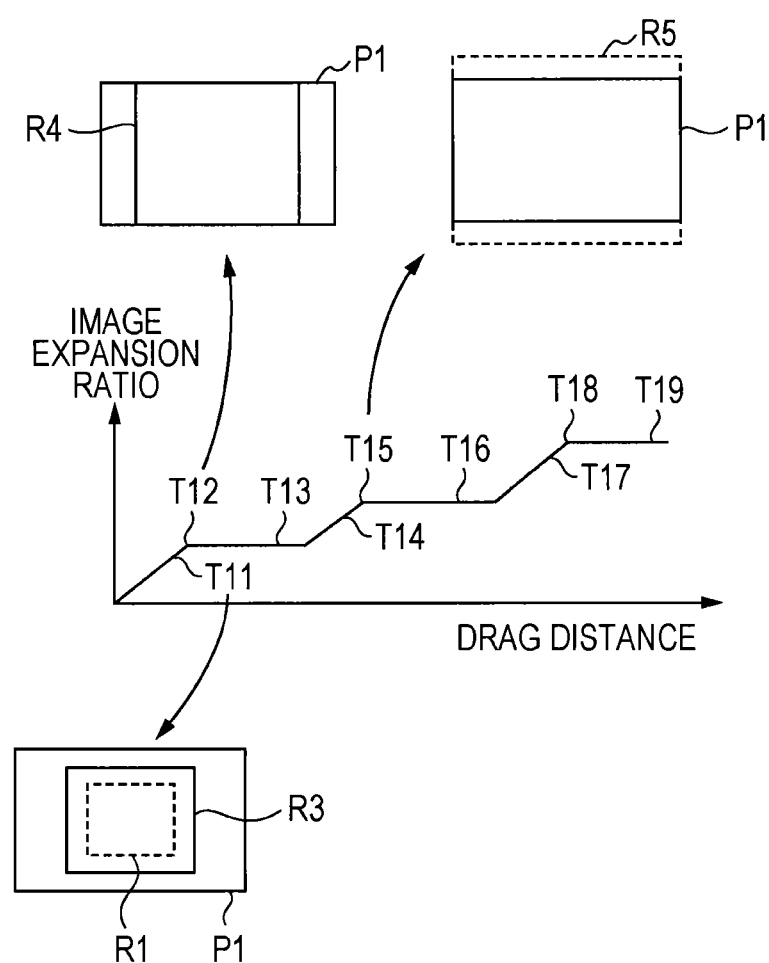
FIG. 6 is an illustration illustrating an image expanded state according to the embodiment of the present disclosure.

Next, the details of the process at the time of image expansion will be described with reference to the flowchart of FIG. 5 and an illustration illustrating an expansion state in FIG. 6. In FIG. 6, the horizontal axis represents the drag distance at the time of a dragging operation, and the vertical axis represents the expansion ratio of an image. Furthermore, T11 to T19, which are indicated within parentheses, in the respective steps in the flowchart of FIG. 5, indicate processes performed at distance sections (or timings) T11 to T19 shown in FIG. 6.

A description will be given with reference to the flowchart of FIG. 5. First, the user sets a selected region by performing a touch operation of enclosing the region for the object of the zoom process, and thereafter performs a dragging operation of moving the finger on the surface of the screen (step S21). When the dragging operation is started, the control unit 110 performs an image expansion process targeting the selected region in accordance with the drag distance (step S22). The image expansion process in step S22 is a process in which the image is expanded by setting the expansion ratio per unit time period to be fixed while the dragging operation is continued.

Then, the control unit 110 determines whether or not one of the vertical end and the horizontal end of the selected region coincides with the end of the display screen (step S23). When this determination indicates that the one of the vertical end and the horizontal end of the selected region does not coincide with the end of the display screen, the expansion process in step S22 is continued.

Then, when it is determined in step S23 that one of the vertical end and the horizontal end of the selected region coincides with the end of the display screen, the control unit 110 temporarily stops the image expansion process (step S24). The time period during which the expansion is temporarily stopped in step S24 is a comparatively short time period that is determined in advance, such as, for example, 0.5 seconds.

After that, in a case where the dragging operation is still continued, the control unit 110 restarts the image expansion process targeting the selected region in accordance with the drag distance (step S25). Then, the control unit 110 determines whether or not the end of the selected region, which had not yet reached the end of the display screen, coincides with the end of the display screen (step S26). When the determination indicates that the end of the selected region does not coincide with the end of the display screen, the expansion process in step S25 is continued.

Then, when it is determined in step S26 that the end of the selected region coincides with the end of the display screen, the control unit 110 temporarily stops the image expansion process (step S27). This time period during which the expansion is temporarily stopped is set to be the same as the time period during which the expansion process is temporarily stopped in step S24.

After that, in a case where the dragging operation is still continued, the control unit 110 restarts the image expansion process targeting the selected region in accordance with the drag distance (step S28). In the execution of the image expansion process, whether or not the maximum magnification ratio at which the image can be expanded has been reached is determined (step S29). The maximum magnification ratio is a magnification ratio that is determined in advance in accordance with the size of the original image and the number of pixels thereof.

Then, when the control unit 110 determines in step S29 that the maximum expansion magnification ratio has not reached, the expansion process in step S28 is continued. Furthermore, when it is determined in step S29 that the maximum expansion magnification ratio has been reached, the control unit 110 ends the image expansion process (step S30).

In the flowchart of FIG. 5, the process for expanding the image to the maximum magnification ratio by assuming that the dragging operation continues up to the end is described. As has already been described in the flowchart shown in FIG. 3, the image expansion process is completed at the stage at which the fingers for the dragging operation are moved away from the screen.

FIG. 6 illustrates changes of the image in the expansion state up to the maximum magnification ratio, which is illustrated in FIG. 5. In a first distance section T11 immediately after the dragging operation has started, the change of the drag distance and the expansion ratio of the image are fixed. The expansion process in the distance section T11 corresponds to the process of step S22 in FIG. 5. In the distance section T11, as shown in the lower side of FIG. 6, the image of the selected region R1 in the image display region P1 is gradually expanded as an expanded image R3.

Then, when at least one of the sides of the selected region coincides with any one of the ends of the image display region at timing T12 of FIG. 6, the expansion is temporarily stopped in a distance section T13. The distance section T13 corresponds to the process of step S24 in FIG. 5. In the example of the image at timing T12, which is shown in the left upper portion of FIG. 6, a state in which the upper and lower ends of the selected region R4 coincide with the upper and lower ends of the image display region P1.

Then, when the time period determined in the distance section T13 during which the expansion is stopped has passed, the expansion is restarted in a distance section T14, and when another side of the selected region coincides with one of the ends of the image display region, the expansion of the image is temporarily stopped at timing T15. In the example of the image at timing T15, which is shown in the upper right portion of FIG. 6, a state is shown in which the right and left ends of the selected region R5 coincide with the right and left ends of the image display region P1. This state shows that the upper and lower portions of the selected region R5 are outside the image display region P1 and are not displayed.

Then, when the determined time period has passed in a distance section T16 in which the expansion is stopped, the expansion is restarted in a distance section T17, the maximum magnification ratio is reached at timing T18, and the expansion is stopped in the subsequent distance section T19.

In the manner described above, the user performs the dragging operation after the selected region of the image is designated by a touch operation for specifying the region with a path having a substantially circular shape. Consequently, the image expansion process targeting the selected region in association with the dragging operation is performed, enabling a satisfactory expansion process to be performed. In particular, when one of the sides of the selected region that is specified at first coincides with the end of the image display region, the expansion of the image is temporarily stopped. Consequently, by moving the finger in the middle of the dragging operation away from the screen at that timing, the expansion can easily be performed in that state. The display state at the timing at which the expansion is temporarily stopped is a state in which the selected region is expanded to a maximum in the horizontal direction or in the vertical direction. The image is an image in which the selected region is appropriately expanded, and an appropriate expanded image in which the intent of the user is reflected is obtained. Furthermore, both the touch operation of specifying the region with the path of a substantially circular shape, and the dragging operation thereafter can be performed by touching with one finger. For example, it is possible to hold the terminal device 100 with one hand, and expansion can be instructed by a touch operation with the thumb of the hand holding the terminal device 100. Thus, operations can be easily performed with one hand.

[3. Example of Setting of Center Position at Time of Expansion]

Next, a description will be given of a process for setting a center position when an image is to be expanded with reference to the flowchart of FIG. 7 and the example of image arrangement of FIG. 8.

In the example of the image shown in FIGS. 4A-4D, it is shown that the selected region of the image is positioned at nearly the center of the image, and the image is expanded without moving the center position of the image. In comparison, the control unit 110 may calculate the center point of the selected region of the image and may perform setting such that the calculated center point of the selected region becomes nearly the center of the image display region, and thereafter may perform an image expansion process.

Figure 7:
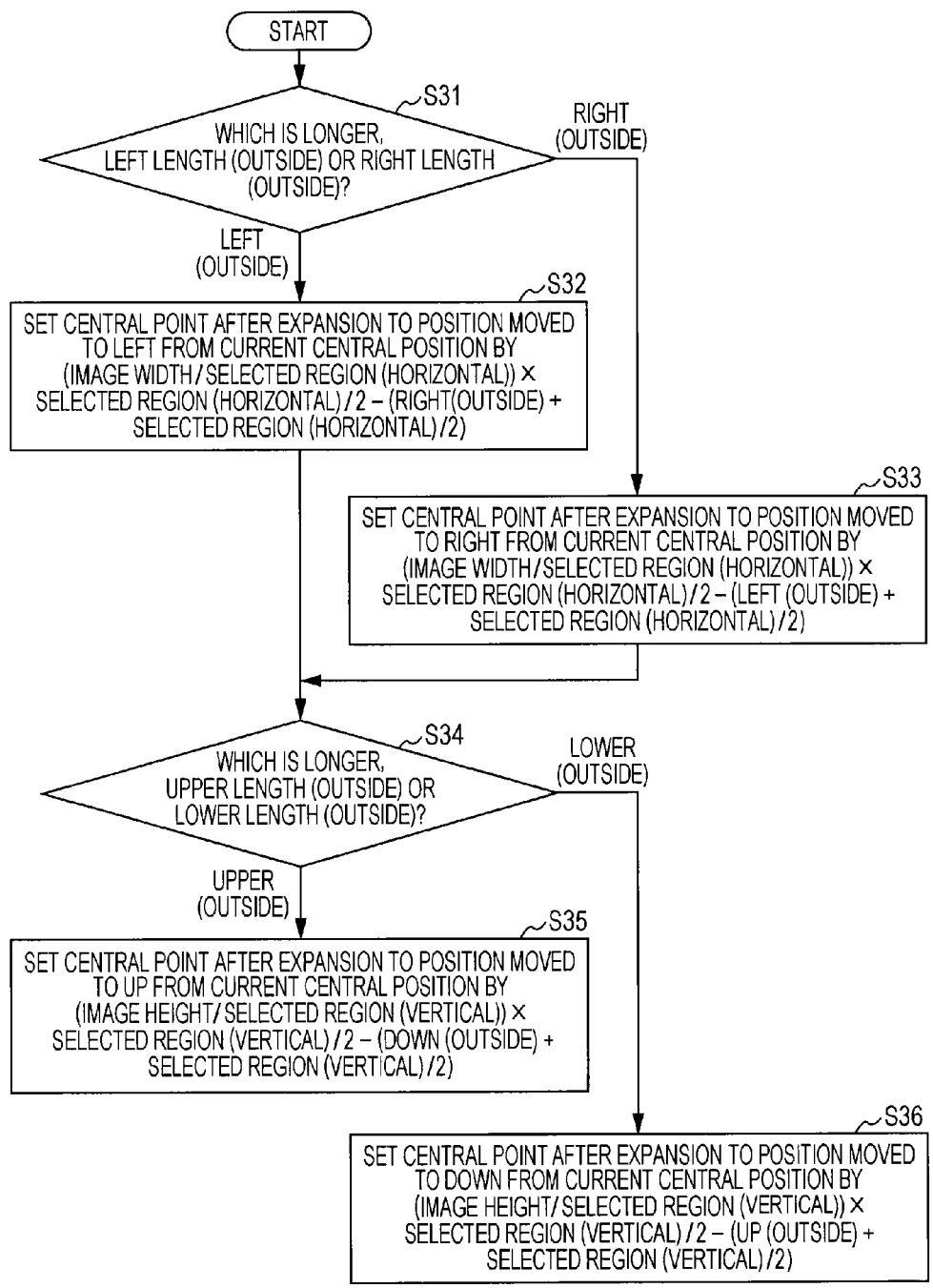
FIG. 7 is a flowchart illustrating an example of a process for setting the center position of a selected region according to the embodiment of the present disclosure.
Figure 8:
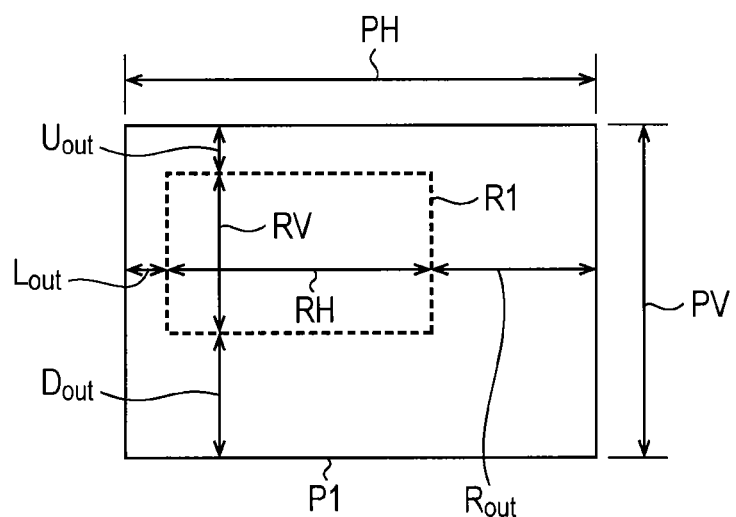
FIG. 8 illustrates a process for setting the center position of a selected region according to the embodiment of the present disclosure.

The flowchart of FIG. 7 shows an example of processing in this case. The length described in each step of FIG. 7 is shown in FIG. 8.

First, when the selected region R1 of the image is determined, the control unit 110 compares the right and left lengths of the image display region P1 outside the selected region R1 with each other. More specifically, the control unit 110 compares the outside length $L_{OUT}$ of the left side of the selected region R1 with the outside length $R_{OUT}$ of the right side of the selected region (step S31). When this comparison indicates that the outside length $L_{OUT}$ on the left side is longer, the control unit 110 sets the position of the center point in the horizontal direction after the expansion to a position that is shifted to the left from the center position of the current selected region by an amount corresponding to the distance calculated in accordance with the following equation (step S32). PH denotes the horizontal width of the image display region, and RH denotes the horizontal width of the selected region. $(PH \div RH) \times RH/2 - (R_{OUT} + RH/2)$ When the comparison of step S31 indicates that the outside length $R_{OUT}$ on the right side is longer, the control unit 110 sets the position of the center point in the horizontal direction after the expansion to a position shifted to the right from the center position of the current selected region by an amount corresponding to the distance calculated in accordance with the following equation (step S33). $(PH \div RH) \times RH/2 - (L_{OUT} + RH/2)$ Next, the control unit 110 compares the upper and lower lengths of the image display region P1 outside the selected region R1 with each other. More specifically, the control unit 110 compares the outside length $U_{OUT}$ of the upper side of the selected region R1 with the outside length $D_{OUT}$ of the lower side of the selected region (step S34). When this comparison indicates that the outside length $U_{OUT}$ on the upper side is longer, the control unit 110 sets the position of the center point in the vertical direction after the expansion to a position shifted to the upward from the center position of the current selected region by an amount corresponding to the distance calculated in accordance with the following equation (step S35). PV denotes the vertical width of the image display region, and RV denotes the vertical width of the selected region. $(PV \div RV) \times RV/2 - (D_{OUT} + RV/2)$ Furthermore, when the comparison of step S34 indicates that the outside length $D_{OUT}$ on the lower side is longer, the control unit 110 sets the position of the center point in the vertical direction after the expansion to a position shifted to the downward from the center position of the current selected region by an amount corresponding to the distance calculated in accordance with the following equation (step S36). $(PV \div RV) \times RV/2 - (U_{OUT} + RV/2)$ As a result of setting the shift position in the manner described above, an expansion process is performed in a state in which the selected region designated by the user by performing the touch operation of specifying the region with a path having a substantially circular shape is arranged in the center of the display region. The process for shifting the display image to the position calculated in the process shown in the flowchart of FIG. 7 is performed when, for example, step S22 of the flowchart of FIG. 5 is to be started.

In the example of the processing of the flowchart of FIG. 7, by performing the computation process in the control unit 110, the amount such that the center of the selected region is shifted to the center of the image display region is obtained. Alternatively, by performing another process, the shift amount such that the selected region is moved to the center of the image display region may be obtained. For example, the control unit 110 may make a determination as to how much the pixel position in the center of the selected region has been shifted from the center of the image display region and may shift the display position by the amount of the determined shift.

[4. Example of Image Reduction Process]

Next, a description will be given, with reference to the flowchart of FIG. 9 and an illustration illustrating reduction states of FIG. 10, of processing performed when the image that is expanded in the process described with reference to the flowchart of FIG. 5 is reduced and returned to the original size. In FIG. 10, the horizontal axis represents the drag distance at the time of a dragging operation, and the vertical axis represents the expansion ratio of an image. Furthermore, T21 to T29 indicated within parentheses in each step in the flowchart of FIG. 9 indicate processes performed at distances (or timings) T21 to T29, which are shown in FIG. 10.

A description will be given with reference to the flowchart of FIG. 9. First, in order to instruct entry to the screen reduction mode, the user performs a touch operation, which is a so-called double-tap, of tapping two times continuously the expanded and displayed image (step S41). In addition, the user performs a dragging operation of moving the finger in the downward direction on the surface of the screen after the double-tap operation. When the dragging operation is started, the control unit 110 performs an image reduction process in accordance with the drag distance (step S42). The image expansion process in step S42 is a process in which, by setting the reduction ratio per unit time period to be fixed while the dragging operation is continued, the image is reduced.

Then, the control unit 110 determines whether or not the expansion ratio at which one of the vertical and horizontal ends of the selected region that is set at the time of the expansion coincides with the end of the display screen has been reached (step S43). When the determination indicates that the expansion ratio at which one of the vertical and horizontal ends coincides with the end of the display screen has not been reached, the reduction process in step S42 is continued.

Then, when it is determined in step S43 that the expansion ratio at which one of the vertical and horizontal ends of the selected region coincides with the end of display screen is reached, the control unit 110 temporarily stops the image reduction process (step S44). The time period during which the expansion is temporarily stopped in step S44 is set to be the same as the time period (for example, 0.5 seconds) during which the expansion is temporarily stopped in steps S24 and S27 in the flowchart of FIG. 5 at the time of expansion.

After that, in a case where the dragging operation is still continued, the control unit 110 restarts the image reduction process in accordance with the drag distance (step S45). Then, the control unit 110 determines whether or not one end among the ends of the selected region, which had not yet reached the end of the display screen, coincides with the end of the display screen (step S46). When the determination indicates that the end of the selected region does not coincide with the end of the display screen, the control unit 110 continues to perform the reduction process in step S45.

Then, when it is determined in step S46 that the expansion ratio at which the end of the selected region coincides with the end of the display screen is reached, the control unit 110 temporarily stops the image reduction process (step S47). The time period during which the reduction is temporarily stopped is set to be the same as the time period during which the reduction process is temporarily stopped in step S44.

After that, in a case where the dragging operation is still continued, the control unit 110 restarts the image reduction process (step S48). The control unit 110 determines whether or not the image has returned to the original display size as a result of the execution of the image reduction process (step S49).

Then, when the control unit 110 determines in step S49 that the image is not at the original display size, the expansion process in step S48 is continued. Furthermore, when it is determined in step S49 that the image has reached the original display size, the control unit 110 ends the image reduction process (step 50). In the reduction process shown in the flowchart of FIG. 9, a process in which by assuming that the dragging operation is continued up to the end, the image is reduced up to the original size is described. However, the control unit 110 stops the reduction of the image when the control unit 110 detects that the finger for the dragging operation has been moved away from the screen.

Figure 9:
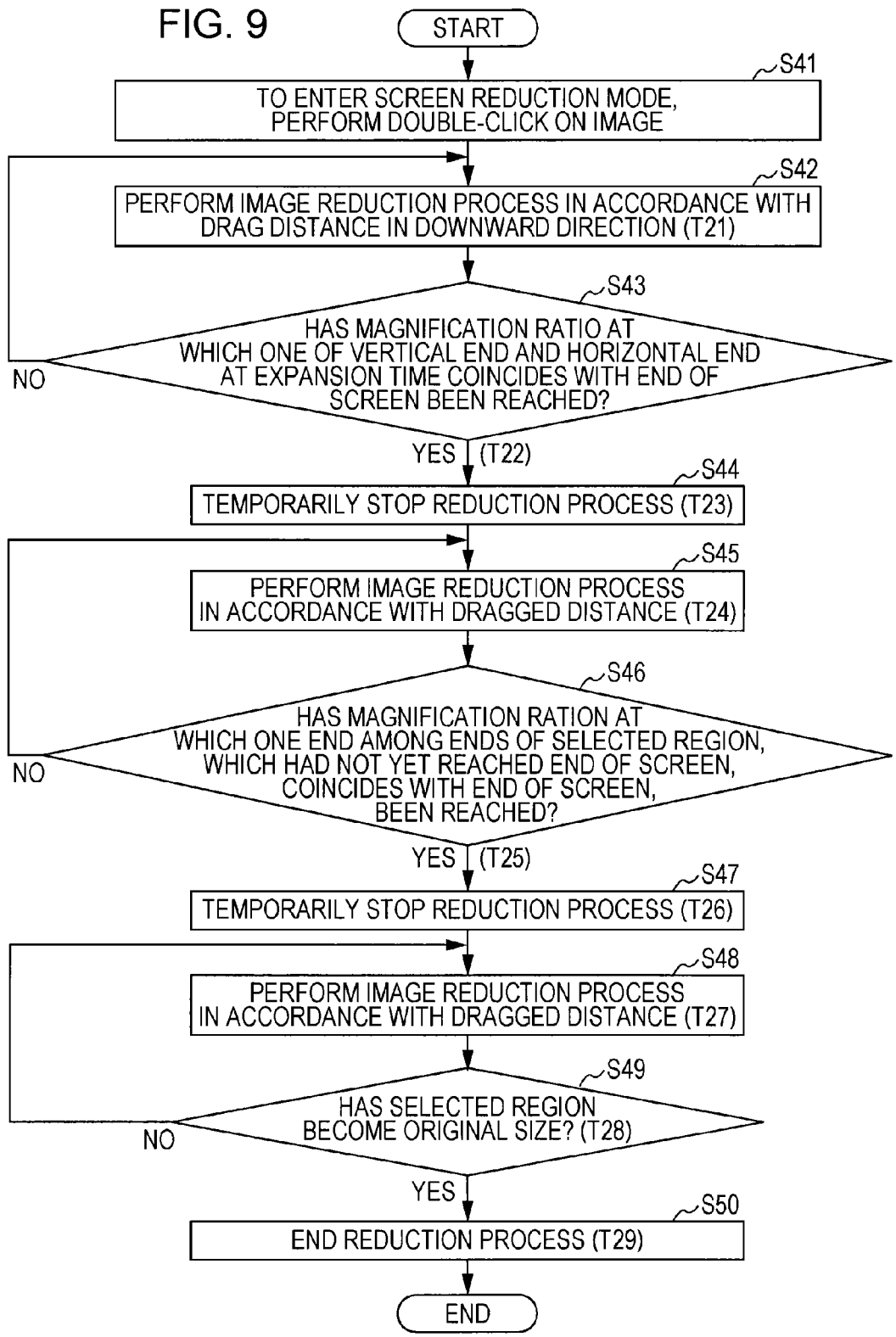
FIG. 9 is a flowchart illustrating an example of an image reduction process according to the embodiment of the present disclosure.
Figure 10:
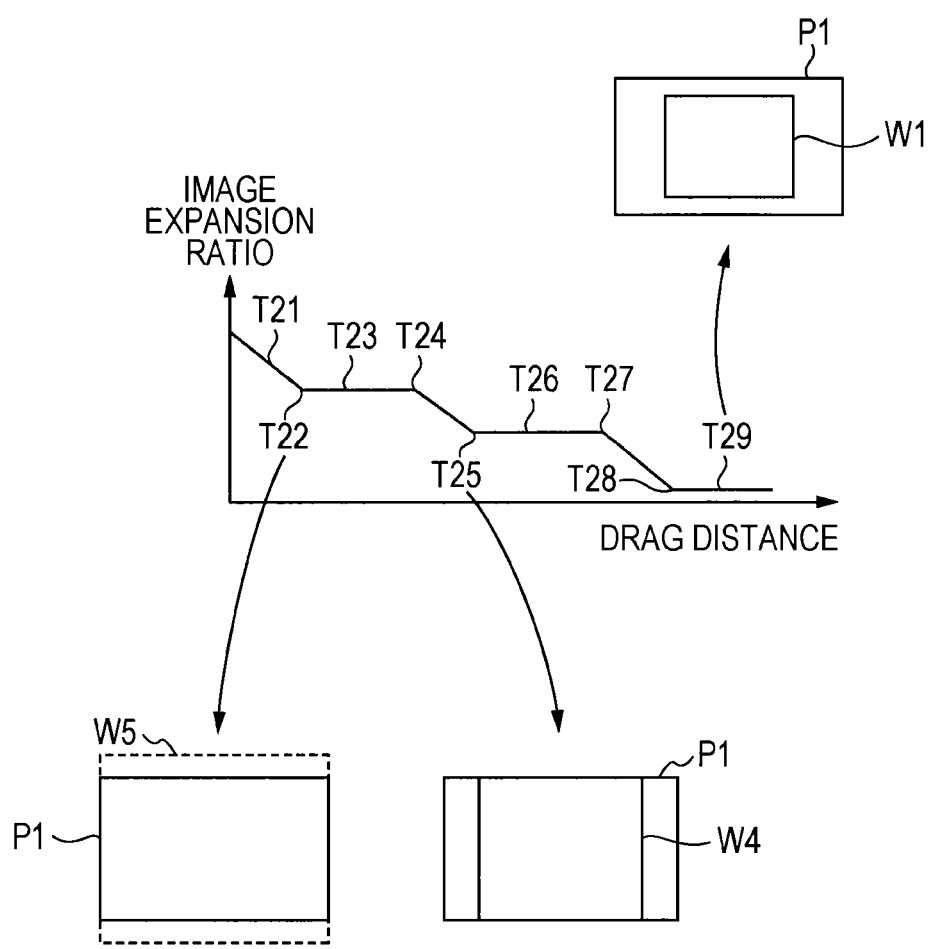
FIG. 10 is an illustration illustrating an image reduced state according to the embodiment of the present disclosure.

FIG. 10 shows the change in the reduction state of an image up to the original size, which are shown in FIG. 9. In a first distance section T21 immediately after the dragging operation is started, the change in the drag distance and the expansion ratio of the image are fixed, and the expansion ratio gradually decreases. The expansion process in the distance section T21 corresponds to the process in step S42 of FIG. 9.

Then, when at least one of the sides of the selected region coincides with one of the sides of the image display region P1 at timing T22 of FIG. 9, the reduction is temporarily stopped in a distance section T23. The distance section T23 corresponds to the process of step S44 of FIG. 9. In the example of the image at timing T22 shown in the left lower portion of FIG. 10, a state in which the right and left ends of the selected region W5 coincide with the right and left ends of the image display region P1 is shown.

Then, when the determined time period has passed in the distance section T23 in which the reduction is stopped, the reduction is restarted in a distance section T24, and as a result of another side of the selected region coinciding with one of the ends of the image display region at timing T25, the reduction is temporarily stopped. In the example of the image at timing T25, which is shown in the right lower portion of FIG. 10, a state in which the right and left ends of a selected region W4 coincide with the right and left ends of the image display region P1 is shown.

Then, when the determined time period has passed in a distance section T26 in which the reduction is stopped, the reduction is restarted in a distance section T27, the original size is reached at timing T28, and the reduction is stopped in the subsequent distance section T29. In the example of the image at timing T29, which is shown in the upper right portion of FIG. 10, a state in which a selected region W5 is displayed at the original size within the image display region P1 is shown. In a case where the process for shifting the center position, which is described in the flowchart of FIG. 7, is performed at the time of the expansion, the center position may be returned to the original from the position at which the center position has been shifted at the stage in which the image is displayed at the original display size at timing T29.

In the manner described above, with the touch operation of the user, it is possible to easily perform an operation of reducing the expanded image to the original size.

[5. Modification]

In the above-mentioned embodiment, as shown in FIG. 4, in a process in which the path of a circular shape or the like, which is drawn with a touch operation by the user, is normalized to determine the selected region of a quadrangle, a rectangle having the tangential lines of the upper, lower, right, and left ends of the path is set as a selected region indicating the region to be expanded. In comparison, the selected region may be determined by another normalization process.

Figure 11A:
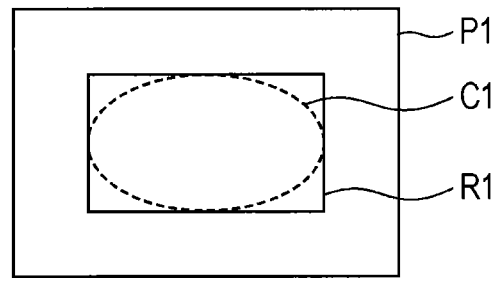
FIGS. 11A-11C illustrate an example of setting of an image selected region according to the embodiment of the present disclosure.

More specifically, in the determination process that has already been described, as shown in FIG. 11A, when the user draws a path C1 with a touch operation within the image display region P1, a rectangle having, as the sides, the lines tangential to the upper, lower, left, and right ends of the path C1, is set as the selected region R1 indicating the region to be expanded.

Figure 11B:
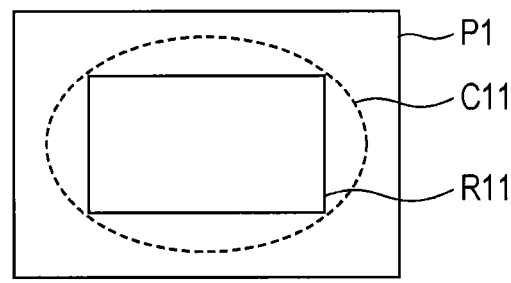

In comparison, as shown in FIG. 11B, the control unit 110 may set, as a region to be expanded, a selected region R11 formed of a rectangle of a maximum size, which is inscribed to the path C11 with a touch operation performed by the user.

Figure 11C:
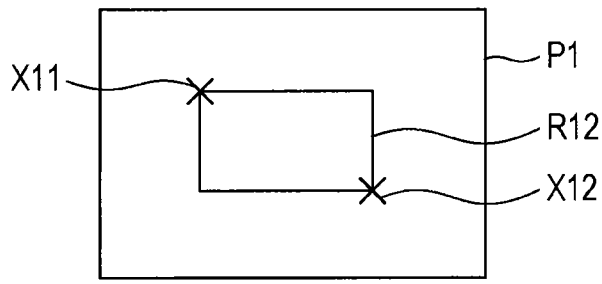

Alternatively, as shown in FIG. 11C, the control unit 110 may set, as a region to be expanded, a selected region R12 of a rectangle in which the user specifies two points X11 and X12 with a touch operation, and the two points X11 and X12 are used as corners.

Furthermore, as shown in FIG. 11A, when the control unit 110 determines the selected region on the basis of a path having a circular shape or the like drawn with a touch operation by the user, if positions serving as references, such as the upper end, the lower end, the left end, and the right end, can be determined, the path having a shape which is not a completely closed circle or the like may be used.

Furthermore, the operation of instructing expansion after the selected region to be expanded is determined is set as a dragging operation in the upward direction. Alternatively, the instruction of the expansion may be given in a similar manner by using a dragging operation in another direction. Furthermore, the control unit 110 may detect a user operation other than the dragging operation of moving on the surface with a touch operation, and may perform an expansion process of the selected region corresponding to the detected user operation.

Figure 12A:
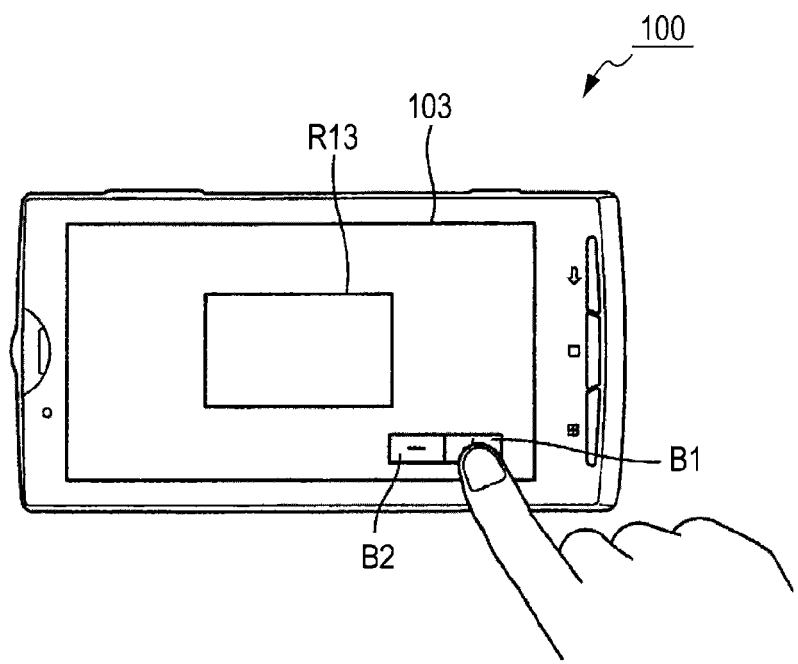
FIGS. 12A and 12B illustrate an example of an operation according to the embodiment of the present disclosure.

For example, as shown in FIG. 12A, after the user designates a selected region R13 with a touch operation, the control unit 110 causes a [+] button B1 and a [−] button B2 to be displayed on the display screen. Then, when the control unit 110 detects the touch operation of the [+] button B1, an image expansion process is performed in accordance with the time period during which the [+] button B1 is being pressed. Furthermore, when the control unit 110 detects the touch operation of the [−] button B2, an image reduction process is performed in accordance with the time period during which the [−] button B2 is being pressed.

Figure 12B:
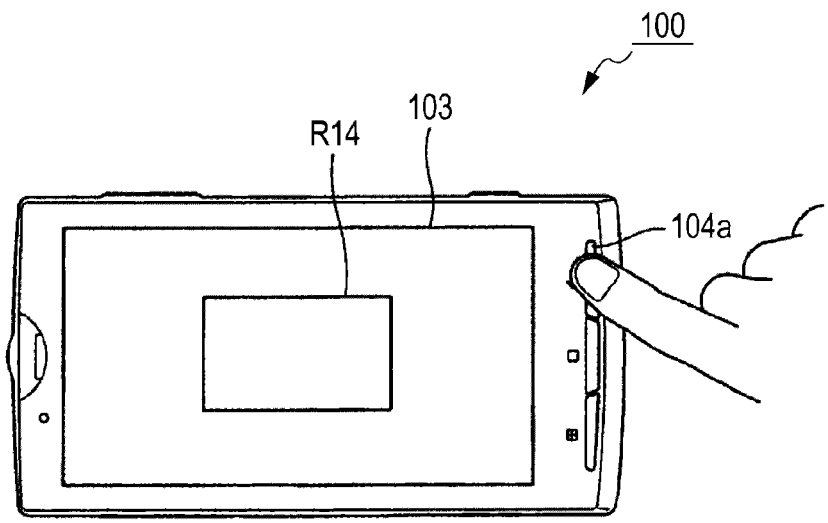

Alternatively, as shown in FIG. 12B, after a selected region R14 is designated with a touch operation, the control unit 110 may perform an image expansion process or an image reduction process in accordance with the operation state of one of the operation keys 104a arranged in the terminal device 100.

Furthermore, in the above-mentioned embodiment, an operation of touching the display screen with the fingers of the user is detected, and an expansion process is performed. Alternatively, an operation using a pen, such as a stylus, for a touch operation may be detected, and the control unit 110 may perform an image expansion process.

Furthermore, in the above-mentioned embodiment, the expansion ratio when the expansion or the reduction of an image is performed is changed at a fixed ratio, as shown in FIGS. 6 and 10 which show the drag distance and the expansion ratio. Alternatively, the control unit 110 may perform variable setting in accordance with the operation state. For example, the control unit 110 may variably set the speed at which the expansion ratio is changed in accordance with the fingers of the user when the user performs a dragging operation. More specifically, when the fingers are quickly moved at the time of the dragging operation, the control unit 110 may set the speed of the change of the expansion ratio to be high, and when the fingers are slowly moved, the control unit 110 may set the speed of the change of the expansion ratio to be low.

Furthermore, in the above-described embodiment, a form is described in which display for making visible the selected region specified by the user with a touch operation is not performed. Alternatively, display for making the selected region visible may be performed. For example, when the selected region is set, the control unit 110 may decrease the display luminance of the image outside the selected region. Alternatively, the control unit 110 may display a frame for making visible the selected region within the image.

Furthermore, in the above-described embodiment, an example in which the present disclosure is configured as a terminal device has been described. Alternatively, for example, a program (software) for executing the processing of the present disclosure may be generated, and the program may be installed into an existing terminal device or computer device. The program for executing processing of the present disclosure is stored on, for example, a storage medium, and the storage medium is loaded into a terminal device and a computer device. For the storage medium, various storage media, such as a semiconductor memory, an optical disc, and a magnetic disc, may be used.

Furthermore, the configuration and processing described in the claims of the present disclosure are not limited to the above-described embodiment. It should be understood of course by those skilled in the art that various modifications, combinations, and other embodiments may be made according to the design or other elements insofar as they come within the scope of the claims, or the equivalence thereof.

For example, the present disclosure may encompass the following configuration(s).

(1) An information processing apparatus comprising: a display; a touch panel stacked on or integrally formed with the display; and a controller that receives an output from the touch panel indicating that first gesture input is detected that substantially encloses a region of the display, and controls the display to expand an image displayed by the display based on a size of the region.

(2) The information processing apparatus of (1), wherein the controller controls the display to expand the image so that an edge portion of the region enclosed by the first gesture input reaches a side of the display.

(3) The information processing apparatus of (1) or (2), wherein the controller receives an output from the touch panel indicating that a second gesture input is detected subsequent to the first gesture input, and controls the display to expand the image based on the second gesture input.

(4) The information processing apparatus of (3), wherein the second gesture input is a gesture input that is a continuation of the first gesture input.

(5) The information processing apparatus of any of (3) or (4), wherein the second gesture input detected by the touch panel is a dragging gesture input.

(6) The information processing apparatus of (5), wherein the controller controls the display to expand the image based on a length of the dragging gesture input.

(7) The information processing apparatus of any of (3) to (6), wherein the controller controls the display to stop expanding the image when the second gesture input is no longer detected.

(8) The information processing apparatus of any of (3) to (7), wherein the controller controls the display to stop expanding the image when an edge portion of the region enclosed by the first gesture input reaches a side of the display and the second gesture operation is still detected.

(9) The information processing apparatus of any of (3) to (8), wherein the controller controls the display to stop expanding the image for a first predetermined period of time when a first horizontal or vertical edge portion of the region enclosed by the first gesture input reaches a side of the display and an output of the touch panel indicates that the second gesture operation is still detected.

(10) The information processing apparatus of (9), wherein the controller controls the display to continue expanding the image when the first predetermined period of time lapses and an output of the touch panel indicates that the second gesture operation is still detected.

(11) The information processing apparatus of (10), wherein the controller controls the display to stop expanding the image for a second predetermined period of time when a second horizontal or vertical edge portion of the region enclosed by the first gesture input reaches a side of the display and an output of the touch panel indicates that the second gesture operation is still detected.

(12) The information processing apparatus of (11), wherein the controller controls the display to continue expanding the image when the second predetermined period of time lapses and an output of the touch panel indicates that the second gesture operation is still detected.

(13) The information processing apparatus of (12), wherein the controller controls the display to stop expanding the image when a maximum magnification ratio of the image is reached.

(14) The information processing apparatus of (12), wherein the controller controls the display to stop expanding the image when a maximum magnification ratio of the image is reached and an output of the touch panel indicates that the second gesture operation is still detected.

(15) The information processing apparatus of any of (1) to (14), wherein the controller normalizes the region corresponding to the first gesture input as a rectangle or square shape.

(16) The information processing apparatus of (15), wherein the controller controls the display to expand the image so that an edge portion of the rectangle or square shape reaches a side of the display.

(17) The information processing apparatus of any of (15) or (16), wherein the controller receives an output from the touch panel indicating that a second gesture input is detected subsequent to the first gesture input, and controls the display to expand the image based on the second gesture input until an edge portion of the rectangle or square shape reaches a side of the display and the second gesture operation is still detected.

(18) The information processing apparatus of any of (1) to (17), wherein the controller controls the display to center the region of corresponding to the first gesture operation on the display when expanding the image.

(19) An information processing method performed by an information processing apparatus, the method comprising: detecting, by a touch panel stacked on or integrally formed with a display of the information processing apparatus, a gesture input that substantially encloses a region of the display; and controlling the display to expand an image displayed by the display based on a size of the region.

(20) A non-transitory computer-readable medium including computer program instructions, which when executed by an information processing apparatus, cause the information processing apparatus to perform a process, the process comprising: detecting, by a touch panel stacked on or integrally formed with a display of the information processing apparatus, a gesture input that substantially encloses a region of the display; and controlling the display to expand an image displayed by the display based on a size of the region.

The invention claimed is:

1. An information processing apparatus comprising:
a display;
a touch panel stacked on or integrally formed with the display; and
circuitry configured to
receive an output from the touch panel indicating that first gesture input is detected that substantially encloses a region of the display;
receive an output from the touch panel indicating that a dragging gesture input is detected subsequent to the first gesture input;
control the display to expand an image displayed by the display when the dragging gesture is performed in a predetermined direction in relation to the display; and
control the display to stop expanding the image when at least one edge portion of the enclosed region corresponding to the first gesture input reaches a side of the display and the dragging gesture operation is still being performed.

2. The information processing apparatus of claim 1, wherein
the circuitry is configured to control the display to expand the image so that the at least one edge portion of the region enclosed by the first gesture input reaches the side of the display.

3. The information processing apparatus of claim 1, wherein
the drag gesture input is a continuation of the first gesture input.

4. The information processing apparatus of claim 1, wherein
the circuitry is configured to control the display to expand the image based on a length of the dragging gesture input.

5. The information processing apparatus of claim 1, wherein
the circuitry is configured to control the display to stop expanding the image when the dragging gesture input is no longer detected.

6. The information processing apparatus of claim 1, wherein
the circuitry is configured to control the display to stop expanding the image for a first predetermined period of time when a first horizontal or vertical edge portion of the enclosed region corresponding to the first gesture input reaches a side of the display and an output of the touch panel indicates that the dragging gesture operation is still detected.

7. The information processing apparatus of claim 6, wherein
the circuitry is configured to control the display to continue expanding the image when the first predetermined period of time lapses and an output of the touch panel indicates that the dragging gesture operation is still detected.

8. The information processing apparatus of claim 7, wherein
the circuitry is configured to control the display to stop expanding the image for a second predetermined period of time when a second horizontal or vertical edge portion of the enclosed region corresponding to the first gesture input teaches a side of the display and an output of the touch panel indicates that the dragging gesture operation is still detected.

9. The information processing apparatus of claim 8, wherein
the circuitry is configured to control the display to continue expanding the image when the second predetermined period of time lapses and an output of the touch panel indicates that the dragging gesture operation is still detected.

10. The information processing apparatus of claim 9, wherein
the circuitry is configured to control the display to stop expanding the image when a maximum magnification ratio of the image is reached.

11. The information processing apparatus of claim 9, wherein
the circuitry is configured to control the display to stop expanding the image when a maximum magnification ratio of the image is reached and an output of the touch panel indicates that the dragging gesture operation is still detected.

12. The information processing apparatus of claim 1, wherein
the circuitry is configured to normalize the enclosed region corresponding to the first gesture input as a rectangle or square shape.

13. The information processing apparatus of claim 12, wherein
the circuitry is configured to control the display to expand the image so that the at least one edge portion of the rectangle or square shape reaches the side of the display.

14. The information processing apparatus of claim 12, wherein
the circuitry is configured to control the display to expand the image based on the dragging gesture input until the at least one edge portion of the rectangle or square shape reaches the side of the display and the dragging gesture operation is still detected.

15. The information processing apparatus of claim 1, wherein
the circuitry is configured to control the display to center the enclosed region corresponding to the first gesture operation on the display when expanding the image.

16. An information processing method performed by an information processing apparatus, the method comprising:
detecting, by a touch panel stacked on or integrally formed with a display of the information processing apparatus, a first gesture input that substantially encloses a region of the display;
detecting, by the touch panel, a dragging gesture input subsequent to the first gesture input;
controlling the display to expand an image displayed by the display when the dragging gesture is performed in a predetermined direction in relation to the display; and
controlling the display to stop expanding the image when at least one edge portion of the enclosed region corresponding to the first gesture input reaches a side of the display and the dragging gesture operation is still being performed.

17. A non-transitory computer-readable medium including computer program instructions, which when executed by an information processing apparatus, cause the information processing apparatus to perform a process, the process comprising:
detecting, by a touch panel stacked on or integrally formed with a display of the information processing apparatus, a gesture input that substantially encloses a region of the display;
detecting, by the touch panel, a dragging gesture input subsequent to the first gesture input;
controlling the display to expand an image displayed by the display when the dragging gesture is performed in a predetermined direction in relation to the display; and
controlling the display to stop expanding the image when at least one edge portion of the enclosed region corresponding to the first gesture input reaches a side of the display and the dragging gesture operation is still being performed.

18. The information processing apparatus of claim 1, wherein
the circuitry is configured to control the display to expand the image displayed by the display only when the dragging gesture is performed in an upward direction in relation to the display and not when the dragging gesture is performed in any other direction in relation to the display.

19. The information processing apparatus of claim 1, wherein
the circuitry is configured to control the display to continuously display the expansion of the image while the dragging gesture is being performed.

20. The information processing apparatus of claim 1, wherein the circuitry is configured to
determine when the at least one edge portion of the enclosed region corresponding to the first gesture input reaches the side of the display; and
control the display to stop expanding the image when the at least one edge portion of the enclosed region corresponding to the first gesture input is determined to reach the side of the display while the dragging gesture operation is still being performed.

* * * * *